G. F. VORHAUER.
FLEXIBLE FILE.
APPLICATION FILED SEPT. 25, 1919.

1,335,866.

Patented Apr. 6, 1920.

WITNESS:
Rob R Kitchel

INVENTOR
George F. Vorhauer
BY
Augustus B Stoughton
ATTORNEY.

UNITED STATES PATENT OFFICE.

GEORGE F. VORHAUER, OF NEW BRIGHTON, PENNSYLVANIA, ASSIGNOR TO WALTER D. CRAFT, OF NEWARK, NEW JERSEY.

FLEXIBLE FILE.

1,335,866.  Specification of Letters Patent.  Patented Apr. 6, 1920.

Application filed September 25, 1919. Serial No. 326,212.

*To all whom it may concern:*

Be it known that I, GEORGE F. VORHAUER, a citizen of the United States, residing at New Brighton, in the county of Beaver and State of Pennsylvania, have invented a new and useful Flexible File, of which the following is a specification.

The principal object of the present invention is to provide a flexible two-faced file having milled undercut diagonally arranged straight teeth and flexible enough to be used as to both faces thereof in connection with a curved holder and yet straight and not laterally deformed, and which can be readily produced by the use of standard machinery and therefore cheaply and rapidly.

Figure 1:
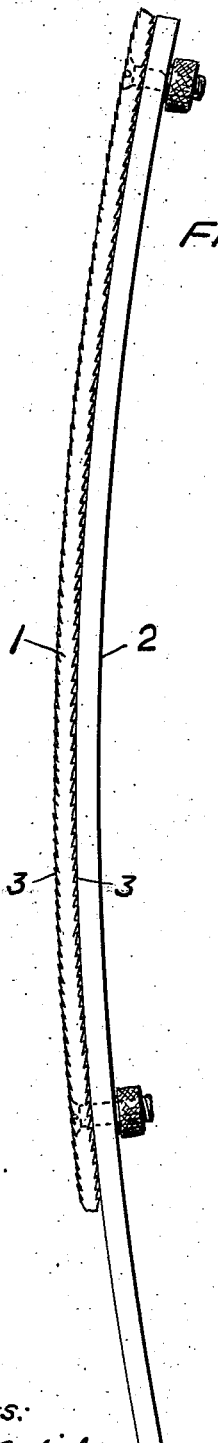
Figure 2:
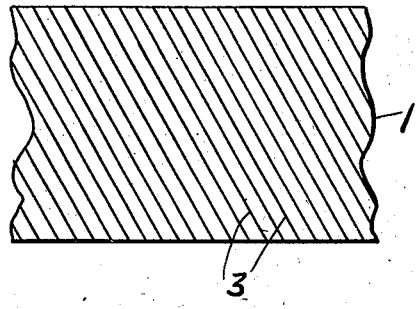
Figure 3:
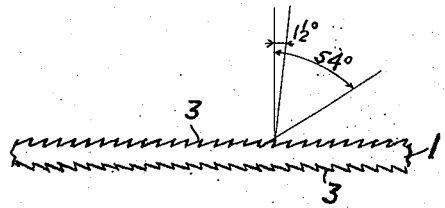

The flexible file of the invention will be claimed at the end hereof but will be first described in connection with the embodiment selected for illustration in the accompanying drawings forming part hereof and in which Figure 1, is a side view of a flexible file embodying features of the invention in application to a curved holder or back, and Figs. 2 and 3, are face and side views drawn to an enlarged scale of an undercut flexible file embodying features of the invention.

In the drawings the blade 1, of the file is straight and thin and consists of one flexible piece. This blade may be made of tungsten steel, sometimes called semi-high speed steel, and may be, for example, seven thirty-seconds of an inch thick, and it is flexible enough to conform as to both faces thereof to the back or holder 2, which may be variously curved to adapt it for use upon certain kinds of curved work, such as automobile bodies. The blade is straight and not laterally curved or deformed, because the teeth 3, which are undercut and straight and disposed diagonally, are milled on each face instead of being hammered or struck up. If the teeth were hammered or struck up upon a blade thin enough to be flexible, the thin blade would tend to be laterally curved or deformed in the cutting and hardening operations, and the form possible with struck up or hammered teeth is not capable of being re-sharpened as frequently as can be done with milled or cut teeth. The use of milling and the formation of the straight undercut teeth, enables the file to do better and smoother work than can be done by hammered or struck up teeth, and straight undercut teeth can be milled by means of standard machinery.

The diagonal disposition of teeth adapts the file to draw filing. The file is coarse cut and well suited to soft metal. The undercut face of each tooth may be inclined, for example, $1\frac{1}{2}$ degrees to the vertical, and the other face of each tooth may be inclined for example 54 degrees to the vertical.

I claim

A file consisting of a unitary, straight, flexible blade having undercut straight diagonally disposed teeth milled on both faces thereof, whereby the blade is laterally straight though thin enough to be flexible.

GEORGE F. VORHAUER.